United States Patent [19]
Mahurin

[11] Patent Number: 6,065,034
[45] Date of Patent: May 16, 2000

[54] CIRCUIT AND METHOD EMPLOYING AN ADDER FOR SIGN EXTENDING OPERANDS

[75] Inventor: Eric W. Mahurin, Austin, Tex.

[73] Assignee: Advanced Micro Devices, Inc., Sunnyvale, Calif.

[21] Appl. No.: 09/057,270

[22] Filed: Apr. 8, 1998

[51] Int. Cl.$^7$ ..................................................... G06F 7/50
[52] U.S. Cl. .......................................... 708/706; 708/204
[58] Field of Search ..................................... 708/706, 700, 708/670, 204

[56] References Cited

U.S. PATENT DOCUMENTS

5,497,341  3/1996  Cohen ....................................... 708/706
5,691,931  11/1997  Nitta ......................................... 708/670

*Primary Examiner*—David H. Malzahn
*Attorney, Agent, or Firm*—Conley, Rose & Tayon, P.C.; Eric A. Stephenson

[57] ABSTRACT

A circuit and method is provided which employs an adder for a sign extending a m bit operand. The circuit m method employs a n adder having first and second sets of n inputs and a set of n outputs. The $m^{th}$ bit or sign bit of the m bit operand to be extended, is inverted to generate a sign inverted m bit operand. This sign inverted m bit operand is inputted into m least significant first inputs of the n bit adder. Thereafter, a (n−m) bit operand is inputted into the (n−m) most significant first inputs of the n bit adder wherein each bit of the (n−m) bit operand represents logical 1. Additionally, n bit operand is inputted into the second n inputs of the n bit adder. The (m+1) most significant bit of the n bit operand represents a logical 1, while the remaining bits of the n bit operand represent logical 0. Upon parallel input of the sign inverted m bit operand, the (n−m) bit operand and the n bit operand into the n bit adder, the n bit adder generates an n bit output operand. The m least significant bits of the n bit operand logically equate to the m bit operand and each of the (n−m) most significant bits of the output operand logically equate to the $m^{th}$ most significant bit of the m bit operand.

11 Claims, 4 Drawing Sheets

CIRCUIT AND METHOD EMPLOYING AN ADDER FOR SIGN EXTENDING OPERANDS

BACKGROUND OF THE INVENTION

1. Field of the Invention

This invention relates to sign extension circuits and more particularly to a circuit employing an adder which can perform sign extension.

2. Description of the Relevant Art

Microprocessors determine the speed and power of personal computers, and a growing number of more powerful machines, by handling most of the data processing in the machine. Microprocessors typically include at least three functional groups: the input output unit (I/O unit), the control unit, and the arithmetic logic unit (ALU).

The I/O unit interfaces between external circuitry and the ALU and the control unit. I/O units frequently include signal buffers for increasing the current capacity of the signal before the signal is sent to external components. The control unit controls the operation of the microprocessor by fetching instructions from the I/O unit and translating the instructions into a form that can be understood by the ALU. In addition, the control unit keeps track of which step of the program is being executed.

The ALU handles the mathematical computations and logical operations that are performed by the microprocessor. The ALU executes the decoded instructions received from the control unit to modify data contained in registers within the microprocessor. Essential components of an ALU may include circuitry for sign extending a m bit operand to an n bit operand. Sign extension is necessary for several reasons when processing operands. Most notably, sign extension is needed to prevent an overflow condition arising upon addition of two m bit signed operands. Sign extension is also needed in order to properly add operands of unequal length.

Upon sign extension, two operands along with a carry or borrow input, can be provided to an adder/subtractor circuit within the ALU without fear of an overflow condition arising. Addition or subtraction are two of the most commonly invoked operations during the execution of a computer program. The speed with which the adder/subtractor circuit can compute the sum or difference of two input operands is extremely important in determining the speed of the overall system. Indeed ALU speed is a critical feature in the design of microprocessors. A further critical design is the area occupied by the ALU within the microprocessor. ALU designers seek to reduce the size of the ALU while increasing the operating frequency thereof.

Figure 1:
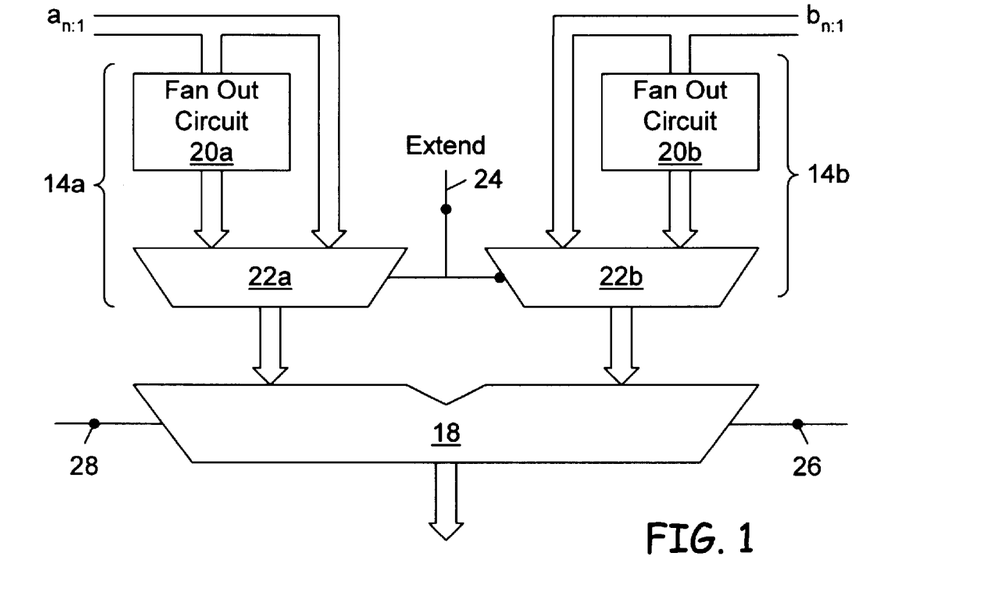
FIG. 1 is a block diagram of relevent portions of a prior art ALU.

FIG. 1 shows select components of a prior art ALU including a pair of sign extension circuits 14$a,b$ coupled to an adder/subtractor circuit 18. Each of the sign extension circuits 14$a,b$ include a fanout circuit 20$a,b$ coupled to a multiplexer 22$a,b$. The first sign extension circuit 14$a$ is configured to receive a first input operand ($a_{n:1}$) which can be a n bit operand or a m bit operand zero extended to n bits. The second sign extension circuit 16 is configured to receive a second input operand ($b_{n:1}$) which can be a n bit operand or a m bit operand zero extended to n bits. The most significant (m+1)th bit in each of the zero extended input operands represents the sign bit of the m bit operands.

Each multiplexer 22$a,b$ has a pair of multiple bit inputs, one of which is configured to receive the output of corresponding fanout circuit 20$a,b$, the other of which is configured to receive the corresponding input operand. Each multiplexer 22$a,b$ also has an input coupled to a control node 24 which is configured to receive a first or second control signal. When the first control signal is provided to control node 24, multiplexer 22$a,b$ operates to pass the output of fanout circuit 20$a,b$ to adder/subtractor circuit 18, wherein the output of the fanout circuit represents the corresponding m bit operand sign extended to n bits. When control node 24 receives the second control signal, multiplexer 22$a,b$ operates to pass the corresponding n bit operand to the adder/subtractor circuit 18.

Adder/subtractor circuit 18 includes a carry/borrow input node 26 and a carry/borrow output node 28. When adder/subtractor circuit 18 operates as an adder, adder/subtractor circuit adds the outputs provided by multiplexers 22$a,b$ along with a carry input bit provided to carry/borrow input node 26, and generates a n bit result operand along with a carry output bit at carry/borrow output node 28. When adder/subtractor circuit 18 operates as a subtractor, adder/subtractor circuit subtracts the borrow input bit provided to carry/borrow input node 26 and the output provided by multplexer 22$b$ from the output provided by multiplexer 22$a$, and generates a n bit result operand along with a borrow output bit at carry/borrow output node 28.

Figure 2:
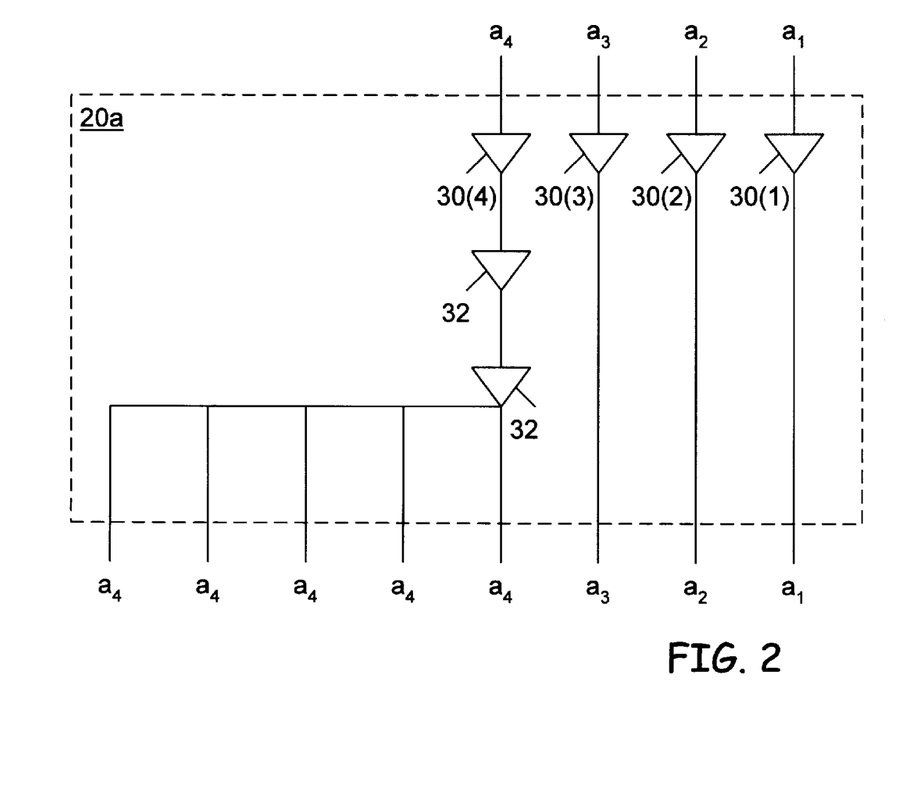
FIG. 2 Schematic diagram of a fanout circuit employed in the ALU of FIG. 1.

FIG. 2 shows a typical fanout circuit 20$a$ used in the ALU of FIG. 1 to generate the m bit operand sign extended to n bits. Fanout circuit 20$b$ is identical in structure. For purposes of illustration, FIG. 2 shows fanout circuit 20$a$ configured to receive a four bit operand of a four bit operand zero extended to eight bits. The fanout circuit includes four inputs and eight outputs. In general, the four inputs are coupled to receive the four bit operand of the four bit operand zero extended to eight bits. The eight outputs generate the four bit operand sign extended to eight bits which, in turn, is provided to multiplexer 22$a$.

Fanout circuit 20$a$ further includes a first set of buffers 30(1)–30(4) coupled to the four inputs, and a series of second buffers 32 coupled in series with buffer 30(4). As can be seen, the four least significant bits outputted by the fanout circuit equate to the four bit operand provided to the fanout circuit. Further, each of the four most significant bits outputted by the fanout circuit equate to the sign bit of the four bit operand provided to the inputs. The series coupled buffers 32 are needed to drive the extra capacity on the four most significant outputs of the fanout circuit. However, one problem with fanout circuit 20 relates to signal propagation delay. More particularly, the five most significant bits of the output are generated after generation of the three least significant bits due to the added delay caused by series coupled buffers 32. Ultimately, this delay slows the operation of the ALU circuit shown in FIG. 1. Moreover, adding the series coupled buffers 32 adds to the silicon area size of fanout circuit 20.

It would be desirable to produce a faster ALU which can extend and/or add operands using less silicon surface area and without the propagation delay of the prior art.

SUMMARY OF THE INVENTION

The problems identified above are in large part addressed by a circuit and method employing an adder for sign extending an m bit operand. Broadly speaking, the present invention in one embodiment contemplates an adder having first and second sets of n inputs, and a set of n outputs. The mth bit or sign bit of an m bit operand to be extended, is inverted to generate a sign inverted m bit operand. This sign inverted m bit operand is inputted into m least significant first inputs of the n bit adder. Thereafter, a (n−m) bit operand is inputted into the (n−m) most significant first inputs of the n bit adder wherein each bit of the (n−m) bit operand represents logical one. Additionally, an n bit operand is inputted into the second n inputs of the n bit adder. The (m+1)th most significant bit of the n bit operand represents logical one, while the remaining bits of the n bit operand represent logical zero. Upon parallel input of the sign inverted m bit operand, the (n−m) bit operand, and the n bit operand into the n bit adder, the n bit adder generates an n bit output operand. The m least significant bits of the n bit output operand logically equate to the m bit operand, and each of the (n−m) most significant bits of the output operand logically equate to the mth most significant bit of the m bit operand. In other words, the n bit adder generates the m bit operand sign extended to n bits.

The present invention further contemplates the use of an adder to extend and add first and second m bit operands. The adder includes n first inputs, n second inputs, and n outputs. The mth most significant bit of the first and second m bit operands are inverted to generate first and second sign inverted m bit operands. It is noted that the mth most significant bit of the first and second operand m bit operands represent the sign bit of the respective first and second operand. The sign inverted first and second m bit operands are provided to the m least significant first and second inputs, respectively, of the adder. Additionally, first and second (n−m) bit operands are provided respectively to the (n−m) most significant first and second inputs of the adder. Each bit of the first (n−m) bit operand represents logical zero while each bit of the second (n−m) bit operand represents logical one. In response to the adder receiving the first and second sign inverted m bit operands in parallel with the first and second (n−m) bit operands, the adder generates a n bit operand which represents the addition of the first and second m bit operand sign extended to n bits.

One advantage of the present invention is that it employs an adder to extend an m bit operand to n bits.

Another advantage of the present invention is that it employs an adder to sign extend and add to m bit operands.

Yet another advantage of the present invention is that it eliminates fanout circuitry of the prior art.

A further advantage of the present invention is that it eliminates delay caused by prior art fanout circuits.

BRIEF DESCRIPTION OF THE DRAWINGS

Other objects and advantages of the invention would become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives filed within the spirit and scope of the present invention as defined by the appended claims.

DETAILED DESCRIPTION OF THE PREFERRED EMBODIMENTS

Figure 3:
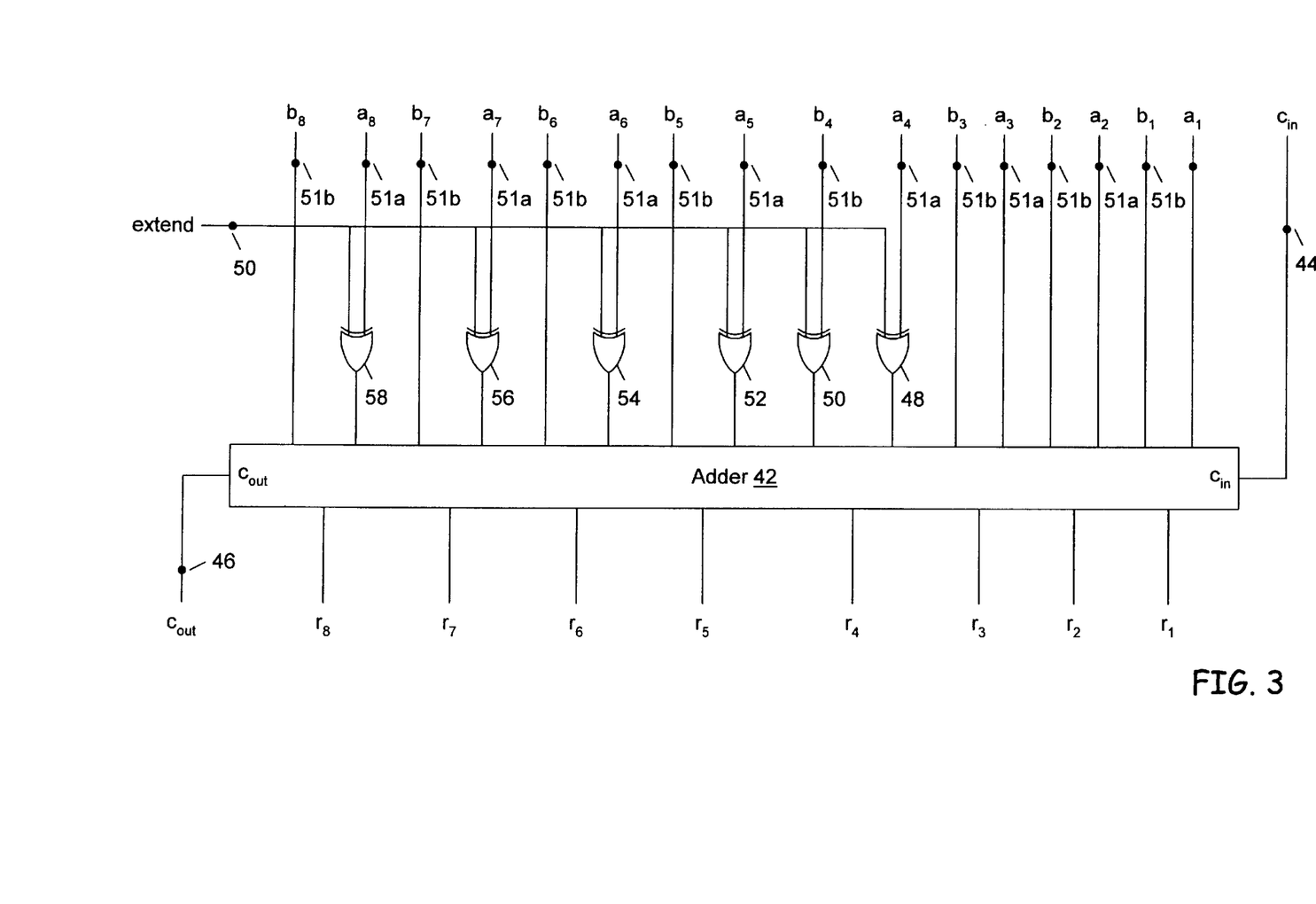
FIG. 3 is a schematic diagram of a circuit employing the present invention for multiple operations, one of which is sign extending m bit operands to n bits.

FIG. 3 illustrates a circuit 40 which can perform several operations, one of which is for sign extending a m bit operand to n bits according to the present invention. The circuit 40 includes an adder 42 having n first inputs, n second inputs, and n outputs. Additionally, adder 42 has a carry input coupled to a carry input node 44, and a carry output coupled to a carry output node 46. For purposes of illustration adder 42 is shown as an eight bit adder configured to add two eight bit operands and a carry input bit and generate an eight bit output operand and a carry output bit. It is to be understood, however, that the present invention can employ adders of varying sizes. Also, for purposes of illustration, FIG. 3 shows a circuit 40 for extending a four bit operand to an eight bit operand, it being understood that the present invention should not be limited thereto.

Circuit 40 includes plurality of XOR gates 48 through 58 coupled to selective first and second inputs of adder 42. One input of each XOR gate 48–58 is coupled to a control node 50. The other input of each XOR gate 48–58 is configured to receive selected bits of first and second input operands ($a_8$ and $b_{8:1}$). When a first signal (logical zero) is received by control node 50, XOR gates 48–58 operate to pass the selected bits of the first and second input operands, and circuit 40 operates as an eight bit adder. When control node 50 receives a second control signal (logical one), XOR gates 48–58 operate to invert selected bits of the first and second operands, and circuit 40 operates to either sign extend a four bit operand to eight bits or to sign extend and add a pair of four bit operands, depending on the first and second input operands. When the second operand ($b_8$) is cleared to logical zero, and a four bit operand, zero extended to eight bits, is inputted as the first operand ($a_{8:1}$), circuit 40, with the second control signal (logical one) inputted to the control node 50, operates to produce the four bit operand sign extended to eight bits. When a pair of four bit operands, zero extended to eight bits, are provided as the first and second operands, circuit 40 operates, with the second control signal (logical one) inputted to control node 50, to sign extend and add the four bit operands.

Circuit 40 of FIG. 3 can best be understood in connection with the following mathematical concepts. In particular, one of ordinary skill in the art will recognize that in binary addition:

(1) $\bar{a}_i + 1 = a_i$, carry=$\bar{a}_i$ for all values of operand bit $a_i$. Given expression (1) above, it is also seen by one of ordinary skill in the art that circuit 40 generates a four bit operand, sign extended to eight bits when the first operand, inputted to first input nodes 51a, is defined as the four bit operand ($a_{4:1}$), zero extended to eight bits and when the second operand, inputted to second input nodes 51b, is cleared to zero, in accordance with the following binary addition:

$$\begin{array}{cccccccc}
\overline{a_4} & \overline{a_4} & \overline{a_4} & \overline{a_4} & 0 & 0 & 0 & 0 = c_{in} \\
1 & 1 & 1 & 1 & \overline{a_4} & a_3 & a_2 & a_1 \\
+ \ 0 & 0 & 0 & 0 & 1 & 0 & 0 & 0 \\
\hline
a_4 & a_4 & a_4 & a_4 & a_4 & a_3 & a_2 & a_1
\end{array} \quad (2)$$

It is noted that in expression (2), carry input bit is equal to logical zero. Circuit 40 of FIG. 3 embodies the concept of expression (2) and operates as a circuit for sign extending the four bit operand $a_{4:1}$ to eight bits when the second operand $b_{8:1}$ is cleared and when the second control signal (logical one) is provided to control node 50.

Extending this concept, it can be seen by one of ordinary skill in the art that two four bit operands ($a_{4:1}$ and $b_{4:1}$) sign extended to eight bits, can be represented by expressions (3) and (4), respectively, as shown below:

$$\begin{array}{cccccccc}
1 & 1 & 1 & 1 & \overline{a_4} & a_3 & a_2 & a_1 \\
+ \ 0 & 0 & 0 & 0 & 1 & 0 & 0 & 0
\end{array} \quad (3)$$

$$\begin{array}{cccccccc}
1 & 1 & 1 & 1 & \overline{b_4} & b_3 & b_2 & b_1 \\
+ \ 0 & 0 & 0 & 0 & 1 & 0 & 0 & 0
\end{array} \quad (4)$$

One of ordinary skill in the art readily recognizes that the binary addition of two logical ones produces a logical zero and a logical one carry. With this in mind, expressions (3) and (4) of the two four bit operands ($a_{4:1}$ and $b_{4:1}$) above, when added together reduces to:

$$\begin{array}{cccccccc}
1 & 1 & 1 & 1 & \overline{a_4} & a_3 & a_2 & a_1 \\
+ \ 0 & 0 & 0 & 0 & \overline{b_4} & b_3 & b_2 & b_1
\end{array} \quad (5)$$

The operands of expression (5) are the inputs to the adder circuit 42 when control node 50 receives the second control signal (logical one) and the first and second operands inputted to input nodes 51a and 51b, respectively, of circuit 40 are defined as four bit operands zero extended to eight bits. Accordingly, one of ordinary skill in the art will recognize that circuit 40, with the second control signal (logical one) provided to control node 50 and with a pair of four bit operands ($a_{4:1}$ and $b_{4:1}$), zero extended to eight bits, provided as first and second inputs, produces the addition of the four bit operands ($a_{4:1}$ and $b_{4:1}$) sign extended to eight bits.

It is noted that sign extension according to the present invention is performed without prior art fan out circuit 20 shown in FIGS. 1 and 2. As a result, an ALU employing circuit 40 performs sign extension and/or addition without the delay or large circuitry required of the prior art as shown in FIGS. 1 and 2.

Figure 4:
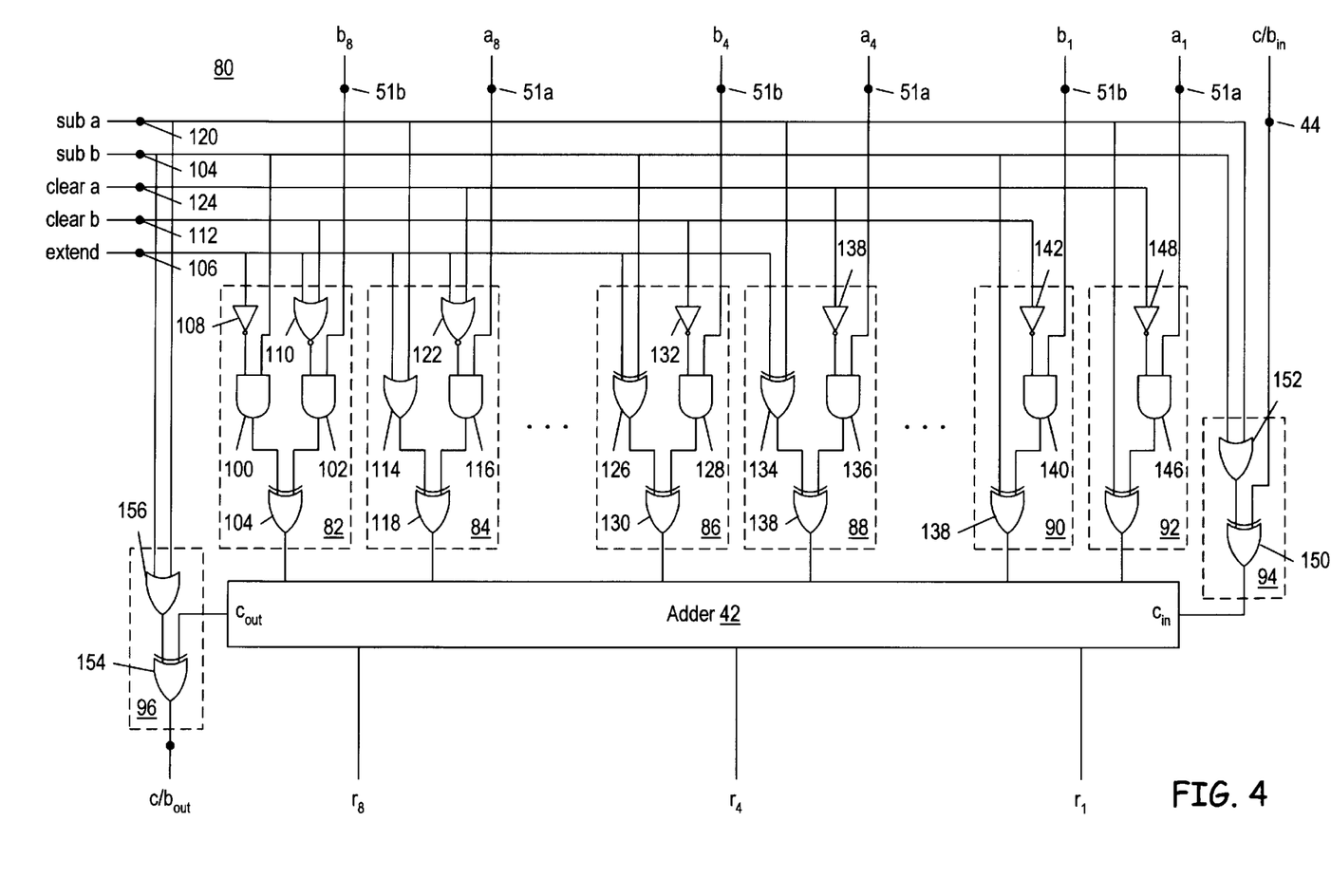
FIG. 4 is a schematic diagram of a circuit employing the present invention for multiple operations, one of which is sign extending and adding m bit operands.

FIG. 4 represents circuit 80 employing the present invention, which in one mode extends and/or adds or subtracts one or a pair of four bit operands ($a_{4:1}$ or $b_{4:1}$) in addition to adding or subtracting one or a pair of eight bit operands ($a_{8:1}$ or $b_{8:1}$) in another mode. Circuit 80 comprises adder 42 having n first inputs, n second inputs, and n outputs. The first and second inputs are coupled to logic blocks 82–92. Although not shown, four logic blocks 82 are coupled to the four most significant second inputs of adder 42, four logic blocks 84 are coupled to the four most significant first inputs of adder 42, three logic blocks 90 are coupled to the three least significant second inputs of adder 42, and three logic blocks 92 are coupled to the three least significant first inputs of adder 42. Logic blocks 86 and 88 are coupled to the fifth most significant second and first adder inputs respectively. Circuit 80 further includes logic blocks 94 and 96 coupled to the carry input and carry output of adder 42.

Logic block 82 shown in FIG. 4 includes a pair of AND gates 100 and 102 coupled in parallel to XOR gate 104. One input of AND gate 100 is coupled to subtract $b_{8:1}$ control input node 104, while the other input of AND gate 100 is coupled to extend control input node 106 via inverter 108. One input is AND gate 102 is configured to receive the most significant bit $b_8$ of the second input operand $b_{8:1}$, while the other input of AND gate 102 is configured to receive the output of NOR gate 110. NOR gate 110 has a pair of inputs coupled respectively to extend control signal input 106 and clear $b_{8:1}$ control signal input node 112. It is noted that the remaining logic blocks 82 not shown are similarly configured except they are coupled to receive $b_{7:5}$ respectively rather than $b_8$.

Control logic block 84 includes OR gate 114 and AND gate 116 coupled in parallel to XOR gate 118. OR gate 114 includes a pair of inputs coupled respectively to extend control signal input node 106 and subtract $a_{8:1}$ control signal input node 120. AND gate 116 has a pair of inputs one input of which is coupled to receive the most significant bit $a_8$ of first operand $a_{8:1}$. The other input of AND gate 116 is coupled to an output of NOR gate 122. NOR gate 122 has a pair of inputs coupled respectively to extend control signal input node 106 and clear a control signal input node 124. It is noted that the remaining logic blocks 84 not shown are similarly configured except they are coupled to receive $a_{7:5}$ respectively rather than $a_8$.

Logic block 86 includes an XOR gate 126 and an AND gate 128 coupled in parallel to an XOR gate 130. XOR gate 126 has a pair of inputs coupled respectively to extend control signal input node 106 and subtract $b_{8:1}$ control signal input node 104. One input of the AND gate 128 is coupled to receive the fifth most significant bit $b_4$ of the second operand $b_{8:1}$. The other input of AND gate 128 is coupled to clear $b_{8:1}$ control signal input node 114 via inverter 132.

Logic block 88 includes an XOR gate 134 and an AND gate 136 coupled in parallel to XOR gate 138. XOR gate 134 includes a pair of inputs coupled respectively to extend control signal input node 106 and subtract $a_{8:1}$ control signal input node 120. One input of AND gate 136 is coupled to receive the fourth most significant bit of first operand $a_4$. The other input of AND gate 136 is coupled to clear $a_{8:1}$ control signal input node 124 via inverter 138.

Logic block 90 includes an XOR gate 138 having a pair of inputs, one of which is coupled to sub $b_{8:1}$ control signal input node 104. The other input of XOR gate 138 is coupled to an output of AND gate 140. AND gate 140 has a pair of inputs, the first of which is coupled to clear $b_{8:1}$ control signal input node 112 via inverter 142. The other input of AND gate 140 is configured to receive the least significant bit $b_0$ of second operand $b_{8:1}$. It is noted that the remaining logic blocks 90 not shown are similarly configured except they are coupled to receive $b_{3:1}$ respectively rather than $b_0$.

Logic block 92 includes XOR gate 144 having a pair of inputs, one of which is coupled to subtract $a_{8:1}$ control signal input node 120. The other input of XOR gate 144 is coupled to an output of AND gate 146. AND gate 146 has a pair of inputs, one of which is coupled to clear $a_{8:1}$ control signal input node 124 via inverter 148. The other input of AND gate 146 is coupled to receive the least significant bit $a_0$ of the first operand $a_{8:1}$. It is noted that the remaining logic blocks 92 not shown are similarly configured except they are coupled to receive $a_{3:1}$ respectively rather than $a_0$.

Logic block 94 comprises an XOR gate 150 having a pair of inputs, one of which is coupled to OR gate 152. OR gate 152 has a pair of inputs coupled respectively to subtract $b_{8:1}$ control signal input 104 and sub $a_{8:1}$ control signal input node 120. The other input of the XOR gate 150 is configured to receive a carry or borrow input bit Logic block 96 includes XOR gate 154 having a pair of inputs, one of which is coupled to the carry output of adder 42. The other input of XOR gate 154 is coupled to an output of OR gate 156. OR gate 156 has a pair of inputs coupled respectively to subtract $b_{8:1}$ control signal input 104 and subtract $a_{8:1}$ control signal input node 120.

As noted above, circuit 80 is configured to operate in distinct modes. Table 1 below shows various operations of circuit 80 in accordance with appropriate control signals provided to control input nodes 104, 106, 112, 120, and 124 in the extended mode. For example, with control nodes 124, 120, and 104 set to logical zero, and with control nodes 112 and 106 set to logical one, circuit 80 sign extends four bit operand inputted to the four least significant first input nodes 51a, to eight bits (and adds carry in bit if inputted concurrently to node 44).

|  | $a_{4:1}$ + carry in | $b_{4:1}$ + carry in | $a_{4:1}$ + $b_{4:1}$ + carry in | $a_{4:1}$ − borrow in | $b_{4:1}$ − borrow in | $a_{4:1}$ − $b_{4:1}$ − borrow in | $b_{4:1}$ − $a_{4:1}$ − borrow in |
|---|---|---|---|---|---|---|---|
| subtract $a_{4:1}$ (120) | 0 | 0 | 0 | 0 | 1 | 0 | 1 |
| subtract $b_{4:1}$ (104) | 0 | 0 | 0 | 1 | 0 | 1 | 0 |
| clear $a_{4:1}$ (124) | 0 | 1 | 0 | 0 | 1 | 0 | 0 |
| clear $b_{4:1}$ (112) | 1 | 0 | 0 | 1 | 0 | 0 | 0 |
| extend (106) | 1 | 1 | 1 | 1 | 1 | 1 | 1 |

Further, it is noted that with extend control signal input node 106 receiving a logical zero circuit 80 operates to perform the various operations in a non-extended mode. In other words, circuit 80 operates to add or subtract eight bit operands $a_{8:1}$ and $b_{8:1}$ provided to circuit 80.

Figure 5:
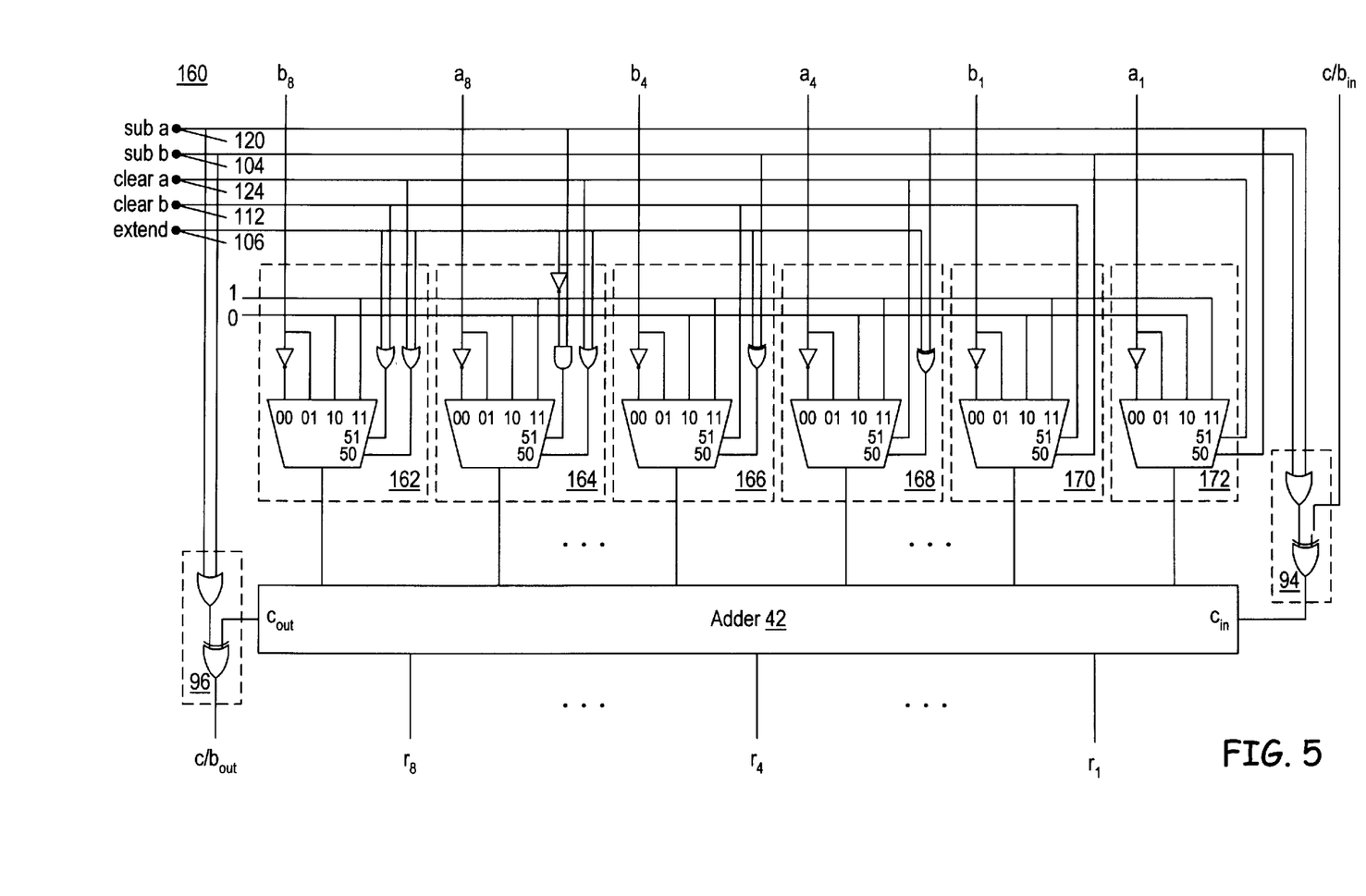
FIG. 5 is a schematic diagram of a circuit employing the present invention for multiple operations, one of which is sign extending and adding m bit operands.

FIG. 5 represents an alternative embodiment of the present invention. In FIG. 5, multiplexer and logic blocks 162–172 replace logic blocks 82–92 of FIG. 4, respectively. However, the circuit shown in FIG. 5 operates substaintially similar to the circuit shown in FIG. 4.

While the present invention has been described with reference to particular embodiments, it will be understood that the embodiments are illustrative and that the invention scope is not so limited. Many variations, modifications, additions and improvements to the embodiment described are possible. These variations, modifications, additions and improvements may fall within the scope of the invention as detailed in the following claims.

What is claimed is:

1. A method of sign extending an m bit operand comprising the steps:

inverting the $m^{th}$ most significant bit of the m bit operand to generate a sign inverted m bit operand;

inputting the sign inverted m bit operand into m least significant first inputs of an n bit adder;

inputting a (n−m) bit operand into the (n−m) most significant first inputs of the n bit adder, wherein each bit of the (n−m) bit operand represents a logical one;

inputting an n bit operand into the second n inputs of the n bit adder, wherein the $(m)^{th}$ most significant bit of the n bit operand represents logical one, and wherein the (n−m) most significant bits and the (m−1) least significant bits of the n bit operand represent logical zero;

wherein the sign inverted m bit operand, the (n−m) bit operand, and the n bit operand are inputted into the n bit adder in parallel;

generating an n bit output operand at n outputs of the n bit adder in response to inputting the sign inverted m bit operand, the (n−m) bit operand, and the n bit operand into the n bit adder;

wherein the m least significant bits of the output operand logically equal the m bit operand, respectively, and wherein each of the (n−m) most significant bits of the output operand equal the $m^{th}$ most significant bit of the m bit operand.

2. A method of sign extending an m bit operand comprising the steps:

inverting the $m^{th}$ most significant bit of the m bit operand to generate a sign inverted m bit operand;

inputting the sign inverted m bit operand into m least significant first inputs of an n bit adder;

inputting a (n−m) bit operand into the (n−m) most significant first inputs of the n bit adder, wherein each bit of the (n−m) bit operand represents logical zero;

inputting an n bit operand into the second n inputs of the n bit adder, wherein (n−m+1) most significant bits of the n bit operand represent logical one, and wherein the (m−1) least significant bits of the n bit operand represent logical zero;

wherein the sign inverted m bit operand, the (n−m) bit operand, and the n bit operand are inputted into the n bit adder in parallel;

generating an n bit output operand at n outputs of the n bit adder in response to inputting the sign inverted m bit operand, the (n−m) bit operand, and the n bit operand into the n bit adder;

wherein the m least significant bits of the output operand logically equal the m bit operand, respectively, and wherein each of the (n−m) most significant bits of the output operand equal the $m^{th}$ most significant bit of the m bit operand.

3. A method of sign extending and adding first and second m bit operands comprising the steps:

logically inverting the $m^{th}$ most significant bit of the first m bit operand to generate a first sign inverted m bit operand;

logically inverting the $m^{th}$ most significant bit of the second m bit operand to generate a second sign inverted m bit operand;

inputting the first sign inverted m bit operand into m least significant first inputs of an n bit adder;

inputting the second sign inverted m bit operand into m least significant second inputs of an n bit adder;

inputting a first (n–m) bit operand into the (n–m) most significant first inputs of the n bit adder, wherein each bit of the first (n–m) bit operand represents logical zero;

inputting a second (n–m) bit operand into the second n inputs of the n bit adder, wherein wherein each bit of the second (n–m) bit operand represents logical one;

wherein the first and second sign inverted m bit operands and the first and second (n–m) bit operands are inputted into the n bit adder in parallel;

generating an n bit output operand at n outputs of the n bit adder in response to inputting the first and second sign inverted m bit operands and the first and second (n–m) bit operands into the n bit adder.

4. A method of sign extending and adding first and second m bit operands comprising the steps:

logically inverting the $m^{th}$ most significant bit of the first m bit operand to generate a first sign inverted m bit operand;

logically inverting the $m^{th}$ most significant bit of the second m bit operand to generate a second sign inverted m bit operand;

inputting the first sign inverted m bit operand into m least significant first inputs of an n bit adder;

inputting the second sign inverted m bit operand into m least significant second inputs of an n bit adder;

inputting a first (n–m) bit operand into the (n–m) most significant first inputs of the n bit adder, wherein each bit of the first (n–m) bit operand represents logical one;

inputting a second (n–m) bit operand into the second n inputs of the n bit adder, wherein wherein each bit of the second (n–m) bit operand represents logical zero;

wherein the first and second sign inverted m bit operands and the first and second (n–m) bit operands are inputted into the n bit adder in parallel;

generating an n bit output operand at n outputs of the n bit adder in response to inputting the first and second sign inverted m bit operands and the first and second (n–m) bit operands into the n bit adder.

5. A circuit for sign extending an m bit operand to an n bit operand, wherein n is greater than m, the circuit comprising:

an adder for adding two n bit operands, the adder comprising n first inputs, n second inputs, and n outputs, wherein the least significant m–1 first inputs are configured to receive bits equivalent to the least significant m–1 bits of the m-bit operand, and wherein each of the least significant m–1 second inputs is configured to receive a bit representing logical zero;

an inverting circuit for logically inverting the $m^{th}$ most significant bit of the m bit operand, wherein the inverting circuit includes an output coupled to the $m^{th}$ least significant first input of the adder;

wherein the $m^{th}$ least significant second input of the adder is configured to receive a bit representing logical one;

wherein each of the most significant n–m first inputs of the adder is configured to receive a bit representing logical zero and each of the most significant n–m second inputs of the adder is configured to receive a bit representing logical one.

6. A circuit for sign extending an m bit operand to an n bit operand, wherein n is greater than m, the circuit comprising:

an adder comprising n first inputs, n second inputs, and n outputs, wherein the least significant m–1 first inputs are configured to receive bits equivalent to the least significant m–1 bits of the m-bit operand, and wherein each of the least significant m–1 second inputs is configured to receive a bit representing logical zero;

an inverting circuit for logically inverting the most significant $m^{th}$ bit of the m bit operand, wherein the inverting circuit includes an output coupled to the least significant $m^{th}$ first input of the adder;

wherein the least significant $m^{th}$ second input of the adder is configured to receive a bit representing logical one;

wherein each of the most significant n–m first inputs of the adder is configured to receive a bit representing logical one and each of the most significant n–m second inputs of the adder is configured to receive a bit representing logical zero.

7. A circuit for sign extending and adding first and second m bit operands, comprising:

an adder comprising n first inputs, n second inputs, and n outputs, wherein the least significant m–1 first inputs are configured to receive bits equivalent to the least significant m–1 bits of the first m-bit operand, and wherein the least significant m–1 second inputs are configured to receive bits equivalent to the least significant m–1 bits of the second m bit operand;

a first inverting circuit for logically inverting the most significant $m^{th}$ bit of the first m bit operand, wherein the first inverting circuit includes an output coupled to the least significant $m^{th}$ first input of the adder;

a second inverting circuit for logically inverting the most significant $m^{th}$ bit of the second m bit operand, wherein the second inverting circuit includes an output coupled to the least significant $m^{th}$ second input of the adder;

wherein each of the most significant n–m first inputs of the adder is configured to receive a bit representing logical zero and each of the most significant n–m second inputs of the adder is configured to receive a bit representing logical one.

8. A circuit for sign extending and adding first and second m bit operands, comprising:

an adder comprising n first inputs, n second inputs, and n outputs, wherein the least significant m–1 first inputs are configured to receive bits equivalent to the least significant m–1 bits of the first m-bit operand, and wherein the least significant m–1 second inputs are configured to receive bits equivalent to the least significant m–1 bits of the second m bit operand;

a first inverting circuit for logically inverting the most significant $m^{th}$ bit of the first m bit operand, wherein the first inverting circuit includes an output coupled to the least significant $m^{th}$ first input of the adder;

a second inverting circuit for logically inverting the most significant $m^{th}$ bit of the second m bit operand, wherein the second inverting circuit includes an output coupled to the least significant $m^{th}$ second input of the adder;

wherein each of the most significant n–m first inputs of the adder is configured to receive a bit representing logical one and each of the most significant n–m second inputs of the adder is configured to receive a bit representing logical zero.

9. The circuit of claim 8 wherein the first inverting circuit comprises an XOR gate having a pair of inputs, one input of which is configured to receive the most significant $m^{th}$ bit of the first m bit operand, the other input of which is configured to receive a first or second extend enable signal, wherein, in response to the XOR gate receiving the first extend enable signal, the XOR gate generates the inverted most significant $m^{th}$ bit of the first m bit operand.

10. The circuit of claim 8 wherein the first inverting circuit comprises a multiplexer having three inputs, and an inverter, wherein the inverter includes an input configured to receive the most significant $m^{th}$ bit of the first m bit operand and an output coupled to the first input of the multiplexer, and wherein the second input of the multiplexer is configured to receive the most significant $m^{th}$ bit of the first m bit operand, and wherein the third input of the multiplexer is configured to receive a first or second extend enable signal, and further wherein, in response to the multiplexer receiving the first extend enable signal, the multiplexer generates the inverted most significant $m^{th}$ bit of the first m bit operand.

11. A circuit for adding first and second zero extended m bit signed operands to produce a sign extended n bit sum operand, wherein n is greater than m, the circuit comprising:

n first input nodes configured to receive the first zero extended m bit signed operand;

n second input node configured to receive the second zero extended m bit signed operand;

an adder comprising n first adder inputs, n second adder inputs, and n adder outputs, wherein the least significant m−1 first adder inputs are coupled to the least significant m−1 first input nodes, respectively, the least significant m−1 second adder inputs are coupled to the least significant m−1 second input nodes, respectively, and the most significant n−m second adder inputs are coupled to the most significant n−m second input nodes, respectively;

a first circuit coupled between the least significant $m^{th}$ first input node and the least significant $m^{th}$ first adder input node, for selectively inverting an operand bit provided to the least significant $m^{th}$ first input node;

a second circuit coupled between the most significant $m^{th}$ second input node and the most significant $m^{th}$ second adder input node, for selectively inverting an operand bit provided to the most significant $m^{th}$ second input node;

n−m third circuits coupled between the least significant n−m first input nodes and the least significant n−m first adder input nodes, respectively, for selectively inverting operand bits provided to the least significant first n−m input nodes.

\* \* \* \* \*